United States Patent
Steinert et al.

(10) Patent No.: US 8,756,402 B2
(45) Date of Patent: Jun. 17, 2014

(54) PROCESSING MODULE, PROCESSOR CIRCUIT, INSTRUCTION SET FOR PROCESSING DATA, AND METHOD FOR SYNCHRONIZING THE PROCESSING OF CODES

(75) Inventors: Mario Steinert, Munich (DE); Werner Hein, Neubiberg (DE); Ralf Itjeshorst, Walpertskirchen (DE)

(73) Assignee: Intel Mobile Communications GmbH, Neubiberg (DE)

( * ) Notice: Subject to any disclaimer, the term of this patent is extended or adjusted under 35 U.S.C. 154(b) by 422 days.

(21) Appl. No.: 11/855,383

(22) Filed: Sep. 14, 2007

(65) Prior Publication Data

US 2009/0077346 A1  Mar. 19, 2009

(51) Int. Cl.
*G06F 15/80* (2006.01)

(52) U.S. Cl.
USPC .......................................................... 712/34

(58) Field of Classification Search
USPC .......................................................... 712/34
See application file for complete search history.

(56) References Cited

U.S. PATENT DOCUMENTS

| | | | | |
|---|---|---|---|---|
| 5,625,775 | A * | 4/1997 | Davis et al. | 709/227 |
| 5,642,482 | A * | 6/1997 | Pardillos | 709/222 |
| 6,144,667 | A | 11/2000 | Doshi et al. | |
| 6,195,676 | B1 | 2/2001 | Spix et al. | |
| 6,282,195 | B1 * | 8/2001 | Miller et al. | 370/392 |
| 6,985,484 | B1 * | 1/2006 | Miller et al. | 370/392 |
| 7,225,355 | B2 * | 5/2007 | Yamazaki et al. | 714/12 |
| 2004/0227763 | A1 * | 11/2004 | Wichman et al. | 345/503 |
| 2005/0213605 | A1 * | 9/2005 | Kim et al. | 370/466 |
| 2006/0059484 | A1 * | 3/2006 | Selvaggi et al. | 718/100 |
| 2007/0036138 | A1 | 2/2007 | Lin et al. | |
| 2007/0183401 | A1 | 8/2007 | Bennett | |
| 2007/0183402 | A1 | 8/2007 | Bennett et al. | |
| 2007/0183405 | A1 | 8/2007 | Bennett | |

FOREIGN PATENT DOCUMENTS

| | | | | |
|---|---|---|---|---|
| GB | 2 345 613 | A | 7/2000 | |
| JP | 2004046611 | A * | 2/2004 | G06F 11/18 |

OTHER PUBLICATIONS

Wikipedia, Semaphore (programming), Feb. 1, 2006.*
Wikipedia, Microcontroller, Jul. 6, 2004.*
Salcic, Zoran et al.; "Software Radio—Architectural Requirements, Research and Development Challenges"; ICCS 2002, The 8th International Conference NCE on Nov. 25-28, 2002, Piscataway, NJ, USA, IEEE, vol. 2, pp. 711-716.
Shirakawa, K. et al.; "FORM: A Frame-Oriented Representative Method for Digital Telecommunication System Design"; European Design and Test Conference, Proceedings in Paris, France Mar. 11-14, 1996, pp. 514-520.

(Continued)

*Primary Examiner* — Aimee Li
(74) *Attorney, Agent, or Firm* — Schiff Hardin LLP (57) ABSTRACT

A processing module, a processor circuit, an instruction set for processing data, and a method for synchronizing the processing of codes are provided. In an embodiment of the invention, a processing module for processing instructions, the instructions relating to user data and control data according to a communication protocol. The processing module includes a first processing circuit configured to process the instructions relating to the control data, and a second processing circuit configured to process the instructions relating to the user data.

11 Claims, 8 Drawing Sheets

(56) References Cited

OTHER PUBLICATIONS

Huang, Si Jun; "Computer, Multimedia and Television"; International Conference on Information, Communications and Signal Processing, Singapore, Sep. 9-12, 1997, vol. 3, pp. 1741-1745.

Vestal, Steve; "MetaH Support for Real-Time Multi-Processor Avionics"; IEEE 1997, pp. 11-21.

Binns, Pam et al.; "An Implementation for Hybrid Continuous Variable/Discrete Event Dynamic Systems"; Proceedings of the 31st Conference on Decision and Control, Tucson, Arizona, Dec. 1992, vol. Conf. 31, pp. 2973-2979.

Bolsens, Ivo et al.; "Hardware/Software Co-Design of Digital Telecommunications Systems": Proceedings of the IEEE, vol. 85, No. 3, Mar. 1997, pp. 391-418.

\* cited by examiner

PROCESSING MODULE, PROCESSOR CIRCUIT, INSTRUCTION SET FOR PROCESSING DATA, AND METHOD FOR SYNCHRONIZING THE PROCESSING OF CODES

TECHNICAL FIELD

Embodiments of the present invention relate generally to a processing module, a processor for generating codes for user data and control data concerning a communication protocol, a co-processor for processing the user data, a method for synchronizing the processing of codes, and an instruction set for processing data concerning a communication protocol.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

In current mobile communication devices the second protocol layer (Medium Access Control (MAC) and Radio Link Control (RLC) layer) (in accordance with the Open System Interconnection (OSI) reference layer mode) is usually realized as software on a microcontroller in the base band, where it is executed. In general, the task for this software has two aspects:

a) The control software, that performs the updating of the internal states based on external incidents or control information, respectively, as well as the control of the communication with other functional circuits.

b) The data processing software that processes the user data. This processing includes as a general rule the segmentation and reassembly, the ciphering and the de-ciphering of control information from/to the overall data. In this context, it is important that the data and the data format, respectively, are treated as a bit stream.

In the following, these two parts are referred to as part a) and part b).

The architecture and the instruction set of microcontrollers are usually very efficient with respect to the processing of functions according to part a), whereas the processing of bit streams according to part b) is usually sub-optimal. This is such much the more bothersome as in current mobile communication devices of the third generation the necessary capability of the microcontroller is dominated by the software according to b) due to the introduction of high data rate connections, as e.g. High Speed Downlink Packet Access (HSDPA)/High Speed Downlink Packet Access (HSUPA).

There exists a desire to alleviate this bothersome effect.

Hitherto, existing solutions are either purely solved in software. Alternatively, hardware accelerators are used for the implementation of the ciphering functions and the de-ciphering functions, respectively. In this case, data are e.g. pre-processed at the microcontroller, stored in the memory and thereafter sent from the memory to the hardware accelerator via a DMA (Direct Memory Access)-channel and are then again stored in the memory via a second DMA channel. Finally, the data can be post-processed at the microcontroller by the software.

Essentially, this solution has the following effects:

1. High capability requirements which increase with further rising data rates for the microcontroller whose architecture is not optimal for this task.

2. When using hardware accelerators that are conceived as pure slave peripheral blocks, an additional high control and communication expense emerges for the software—as e.g. the configuration of the accelerator and of the DMA channels, the initialization of the functions and the waiting for the results.

3. The blocking of shared resources—as e.g. system busses, memory areas etc. due to unnecessary multiple data traffic between the participating function blocks: microcontroller, system bus, memory, DMA controller, and hardware accelerator.

Embodiments of the invention described in the following provide a processing module for generating and processing instructions, in particular instructions according to the RLC layer and the MAC layer of a communication protocol, as e.g. UMTS (Universal Mobile Telecommunications System) or another mobile radio communication protocol such as a Third Generation Partnership project (3GPP) communication protocol (e.g. UMTS or UMTS Long Term Evolution (UMTS LTE)), Code Division Multiple Access (CDMA), Code Division Multiple Access 2000 (CDMA 2000), Freedom of Mobile Multimedia Access (FOMA). The RLC and MAC software is, according to an embodiment of the invention, split into 2 parts corresponding to the description of part a) and part b). The two parts may be processed on different processing circuits.

Moreover, a processor for generating a code for user data and for control data, a co-processor for processing user data, and a definition of a special instruction set that allows an implementation of the functionality according to part b) for e.g. the 3GPP/UMTS MAC- and RLC-layer in uplink direction (e.g. signal transmission from a mobile radio terminal to a respectively associated UMTS base station) or in downlink direction (e.g. signal transmission from a respective associated UMTS base station to a mobile radio terminal) on a dedicated co-processor is provided.

Furthermore, in an embodiment of the invention, a method for generating these instructions and a method of synchronizing the processing of the generated codes is provided.

According to an embodiment of the invention, a processing module for processing instructions is provided, wherein the instructions concern user data according to a communication protocol and control data. According to this embodiment, the instructions concerning the control data are processed on a first processing circuit; and the instructions concerning the user data are processed on a second processing unit.

According to a further embodiment, the first processing circuit is implemented on a microcontroller and the second processing circuit is implemented on a co-processor.

Figure 1:
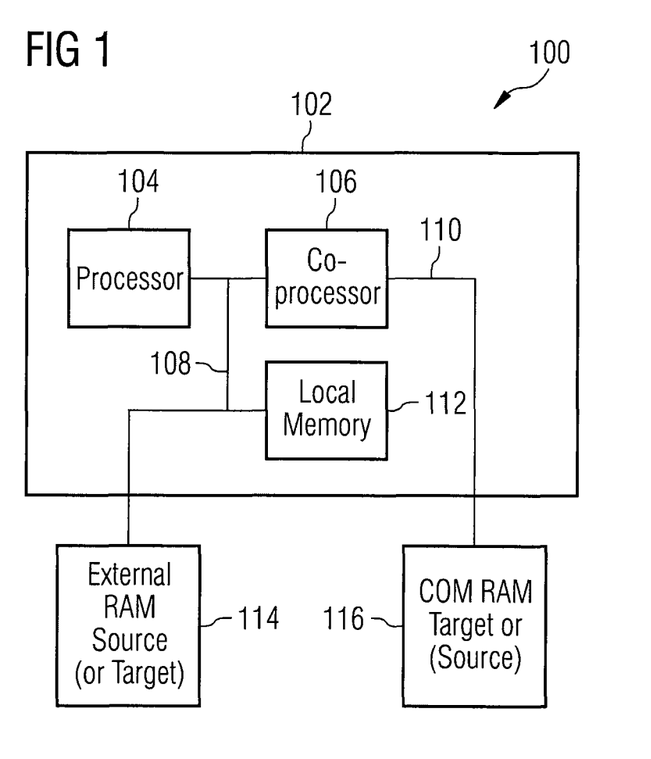
FIG. 1 shows a generic hardware configuration according to an embodiment of the invention.

FIG. 1 shows a processing module 102, that contains a first processsing circuit, such as e.g. a microcontroller 104 (including a complex instruction set computer (CISC) microcontroller and a reduced instruction set computer (RISC) microcontroller) and a second processing circuit, as e.g. a co-processor 106.

In this context the terms processor, micro processor or microcontroller are used equivalently, representing a group of programmable devices, such as e.g. microprocessors, microcontrollers, FPGAs (Field Programmable Gate Arrays) or other integrated programmable logic.

According to an embodiment, the instructions to be processed on the first circuit and the instructions to be processed on the second circuit, i.e., for example, the microcontroller 104 and the co-processor 106, respectively, are generated on the first processing circuit and the instructions to be processed by the second processing circuit are provided by the first processing circuit to the second processing circuit.

A more detailed description of the instructions and the instruction set is provided further below.

The functional part according to b) is hence swapped out into a dedicated co-processor. This means, the software that is executed on the microcontroller is reduced to the functional part a). The elaborated instructions in part a), i.e., which parts of the user data have to be treated in which way, and with which additional control information these data are to be processed to the overall data amount, are arranged in a processing program, passed to the co-processor and processed by the co-processor. Thus, one main component of the processing module 102 is a processor that might be e.g. a microprocessor or controller.

In this document, by the terms program, processing program or code it is e.g. understood a single instruction or a sequence of instructions belonging together; however, depending on the specific context, the terms may also have other meanings.

According to an embodiment, the first processor 104 for generating code for user data and for control data is provided, wherein the code includes instructions for processing data according to a communication protocol and wherein the first processor 104 provides the code for user data to the second processor 106, e.g. the co-processor 106.

This means, the code for both, the control data according to part a) and the user data according to part b) is generated by the first processor 104.

According to a further embodiment, the first processor 104 processes only the code for the control data.

This implies on the other hand, that, according to another embodiment of the invention, a co-processor is provided for processing user data of a communication protocol layer. This might be e.g. the co-processor 106 of the processing module 102. According to an embodiment, the instructions for processing the user data are generated by a processor, as e.g. the first processor 104 of the processing module 102.

The functional part a) that is still executed in software on a microcontroller provides a processing program to the co-processor. Together with the processing program being executed by the co-processor the functional part b) is built.

FIG. 1 shows an example of an implementation for the parts a) and b). Part a) is implemented and executed on the first processor 104 (e.g. the microcontroller) and part b) is implemented and executed on the second processor 106 (e.g. the co-processor 106).

The generated instructions require input data and generate output data that necessitate a memory where they are stored, as well as the instructions that are generated by the processor 104, which is explained by the following embodiments.

According to an embodiment, the processing module 102 thus further contains a Local Memory 112 in which the instructions provided to the second processing circuit are stored. The Local Memory 112 may include volatile memory (such as e.g. dynamic random access memory, DRAM) and/or non-volatile memory (such as e.g. electrically erasable programmable read only memory (EEPROM) such as e.g. Flash memory (e.g. charge storing memory (e.g. floating gate memory or charge trapping memory) or conductive-bridging random access memory (CBRAM), magnetoresistive random access memory (MRAM), phase change random access memory (PCRAM), organic random access memory (ORAM), etc. In an embodiment of the invention, the Local Memory 112 may include random access memory (RAM) and/or read only memory (ROM).

The first processor 104, the second processor 106 (e.g. the co-processor), and the Local Memory 112 of the processing module 102 may connected by an electrical connection such as e.g. a system bus 108, although other type of connection or wiring may be provided in an alternative embodiment of the invention.

According to an embodiment, the first processor 104 transfers the generated code to the Local Memory 112. The co-processor 106 then can easily access the provided instructions via the system bus 108.

According to an embodiment of the invention, the second processor 106 (e.g. the co-processor 106) generates output data according to the instructions, wherein the output data are provided in the form of a target data stream, and wherein the target data stream is stored in a memory.

Therefore, according to a further embodiment of the invention, the processing module 102 further includes an interface to an external memory 114, in which user data of the communication layer may be stored in the form of a source bit stream; and the processing module 102 may further include an interface to a memory (e.g. referred to as communication RAM target) 116, in which the output data in form of an target bit stream produced by the second processing circuit 106, e.g. the co-processor 106, are stored according to the instructions. The external memory 114 may be any type of volatile or non-volatile memory such as the types of memory described above for the Local memory 112.

The output data are transmitted via a local bus 110 to the memory 116.

The task sharing between the software and the second processor 106 (e.g. the co-processor 106) is arranged in such a way that every user data bit is moved at a minimal frequency.

Thus, the following effects are achieved:

1. Minimization of the data movements on their way from the data source to the data sink. As a consequence, the use of resources (electrical current, bandwidth, chip surface area) may be reduced.

2. By splitting the scope of the function into the parts a) and b) as well as assigning them to two processing circuits (e.g. the microcontroller 104 and the co-processor 106), a parallelized pipeline-processing is possible.

3. Since the co-processor 106 concerns a functional block with master functionality, the interaction (in terms of configuration and communication, respectively) between the software and this co-processor 106 is reduced to the provision of the instructions and the end-signalling of the processing.

According to an embodiment of the invention, the output data are transport blocks of a physical layer of the communication protocol, as e.g. the mobile communication protocol of the third generation, as e.g. UMTS.

The link layer is typically the second layer of a communication protocol. It may be subdivided into Medium Access Control (MAC) and Radio Link Control (RLC).

The physical layer is usually the first layer of a communication protocol. It is responsible for the physical communication between a mobile radio communication terminal device (e.g. a user equipment (UE) in UMTS), such as a mobile phone, and a base station (BS) using various radio transmission techniques. It provides the upper layer with an information transfer service and is connected to the MAC layer on the upper layer via transport channels. The data transfer between the MAC and physical layer is carried out via these transport channels. The transport channels may be divided into a dedicated transport channel, used exclusively for a UE, and a common transport channel, shared by a plurality of UEs.

The MAC sublayer provides the reallocation of radio resources and MAC parameters. It maps logical channels to transport channels. The transport channels in turn are mapped to physical channels by the physical layer.

The MAC layer is connected to the RLC layer through a logical channel and provides various logical channels in accordance with the type of the transmission information.

The radio link control (RLC) layer is a protocol sublayer controlling a data link and provides the establishment and release of a radio link. It handles the segmentation of and concatenation relating to an RLC service data unit (SDU) coming down from an upper layer to smaller units suitable for transmission. The size of the RLC SDU is adjusted to fit a processing capacity in the RLC layer. Header information is then added to the segmented part of the SDU to form a protocol data unit (PDU). The resulting RLC PDU is transferred to the MAC layer.

Referring again to the instructions generated by the first processor 104, according to an embodiment of the invention, the instructions are used to convert upper layer data of a communication protocol to a lower layer data or vice versa. The lower layer may be a physical layer and the upper layer may be a data link layer containing an RLC and a MAC layer. Expressed in other words, according to an embodiment, the communication protocol contains a radio link control (RLC) layer and a medium access control (MAC) layer, and the instructions handle data of the a radio link control (RLC) layer and a medium access control (MAC) layer.

According to an embodiment, the communication protocol is a protocol of a mobile communication standard, as e.g. the third generation communication standard, as e.g. UMTS, CDMA2000 and their variants. However the embodiments of the invention are not limited to the third generation standard. They may also be applied for to other communication standards (e.g. other mobile radio communication standards) containing a layered architecture. It may also work for other layers as the RLC/MAC layer, with the information of the instruction as e.g. headers adapted accordingly.

The instruction format maybe chosen in such a way that a single instruction contains all information needed for the composition of a transport block for the physical layer.

These may be:

The opcode that codes the type of the transport block.
The source address and the length of the source bit stream.
The destination address and the length of the destination bit stream.
The header of the Radio Link Control (RLC) protocol layer.
The header of the Medium Access Control (MAC) protocol layer.
Ciphering parameter(s).
Control parameter(s) for the co-processor.

More complex transport blocks may be implemented as a sequence of instructions.

The coding format of an instruction is selected in such a way that it can be generated by the software in the microcontroller at low effort.

This may be:
Fixed length of the instruction.
Byte segmentation of the coding elements.

Moreover, the instruction can be decoded by the dedicated co-processor at low effort because the coding elements are situated in every instruction at the same position.

In an embodiment of the invention, the resulting effects may be:

1. Augmentation of the efficiency of the protocol processing by a specialized data path without loss of the programming flexibility.
2. The microcontroller 104 is prevented from data intensive packet processing steps.
3. The microcontroller 104 and the co-processor 106 are coupled via the instruction set interface only loosely. This is exploited by pipelining of the processes on the microcontroller 104 and the co-processor 106.

Hence, according to an embodiment, the instructions are constituted of a fixed format for the generation of the transport blocks. According to this embodiment, the fixed format comprises data fields containing at least the following information:

Type of the transport block;
Source address and length of the source bit stream;
Target address and length of the target bit stream;
Header of the Radio Link Control (RLC) protocol layer:
Header of the Medium Access Control (MAC) protocol layer;
Ciphering parameter(s);
Control parameters for the second processing circuit.

In an embodiment of the invention, an instruction set for processing data according to a communication protocol is provided. According to this embodiment, the instruction set contains instructions for user data of a communication protocol layer. Furthermore, according to this embodiment, the instruction set is generated by a first processing circuit and the instruction set is processed by a second processing circuit.

An example of the instruction set is presented in the following embodiments and is graphically explained thereafter by means of FIG. 2.

According to an embodiment, the communication protocol is a communication protocol of a mobile radio communication standard, as e.g. UMTS, CDMA 2000, FOMA, etc.

According to an embodiment of the invention, the user data in respect to the instruction set is data of an RLC/MAC layer structure of the communication protocol.

According to an embodiment, the instruction set contains a field with information about a source data address and a source data length of the relevant data contained in a source data stream.

According to an embodiment, the instruction set contains a field with information about a target data address and a target data length of the relevant data contained in a target data stream.

According to an embodiment, the instruction set provides information to the second processing circuit enabling the second processing circuit to generate the target data stream data from the source data stream data. In other words, the second processing circuit is provided with the necessary information in order to gain knowledge, how to generate the output data.

In an embodiment of the invention, the instruction set further includes the following fields:
Identifier of the Opcode;
Medium Access Control (MAC) header;
Radio Link Control (RLC) header;
Length Indicator.

Figure 2:
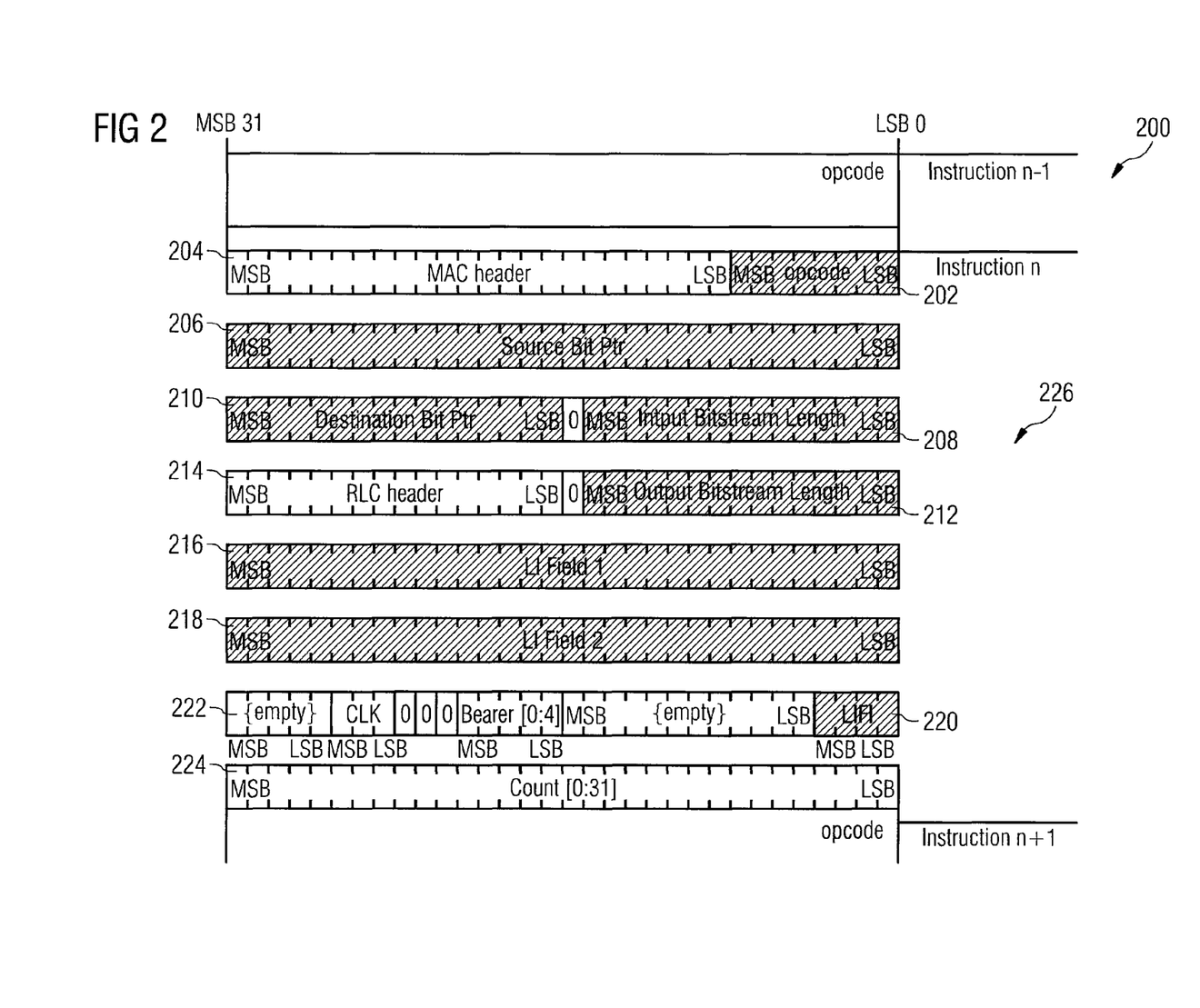
FIG. 2 shows an instruction example according to an embodiment of the invention.

An example of an instruction set is shown in FIG. 2. The FIG. 2 shows in an embodiment of the invention a typical instruction for the composition of a transport block of a mobile communication standard such as e.g. 3GPP/UMTS.

A first field 202 of the instruction n 126 (wherein n is an arbitrary number) specifies the opcode that may be e.g. an 8-bit binary value with the Most Significant Bit (MSB) on the left hand side.

A second field 204 includes the 24-bit MAC header and completes the first 32-bit word of the instruction n 226.

The second word is e.g. a source bit pointer 206 that includes the address of the source bit stream that indicates where to read the source data from. In the next word, a third field 208 contains the input bitsream length, i.e. the bit stream length of the source, and the destination bit pointer 210 that points to an address of the output data stream. The length of the output data bit stream is indicated in a fourth field 212. The fourth field 214 contains the RLC header.

The further fields 216 and 218 are Length Indicator (LI) fields. The length indicator fields indicate the start and the end of the RLC SDU. The LI fields are set to a value expressed in bytes, indicating the number of bytes to the end of an RLC SDU from an RLC header. The last two words contain the identity of the bearer, a Ciphering Key (CKI) field and a COUNT field. The radio bearer ID is a unique identifier of the relevant bearer or logical channel(s) used by a particular RRC (Radio Resource Control) connection. It is used to ensure that the same ciphering algorithm is not applied to other bearer channels. The radio bearer identifier is typically five bits long. The COUNT field includes a counter register composed of a "long" sequence number called a HFN (Hyper Frame Number) and a "short" sequence number which may depend on the ciphering mode.

Figure 3:
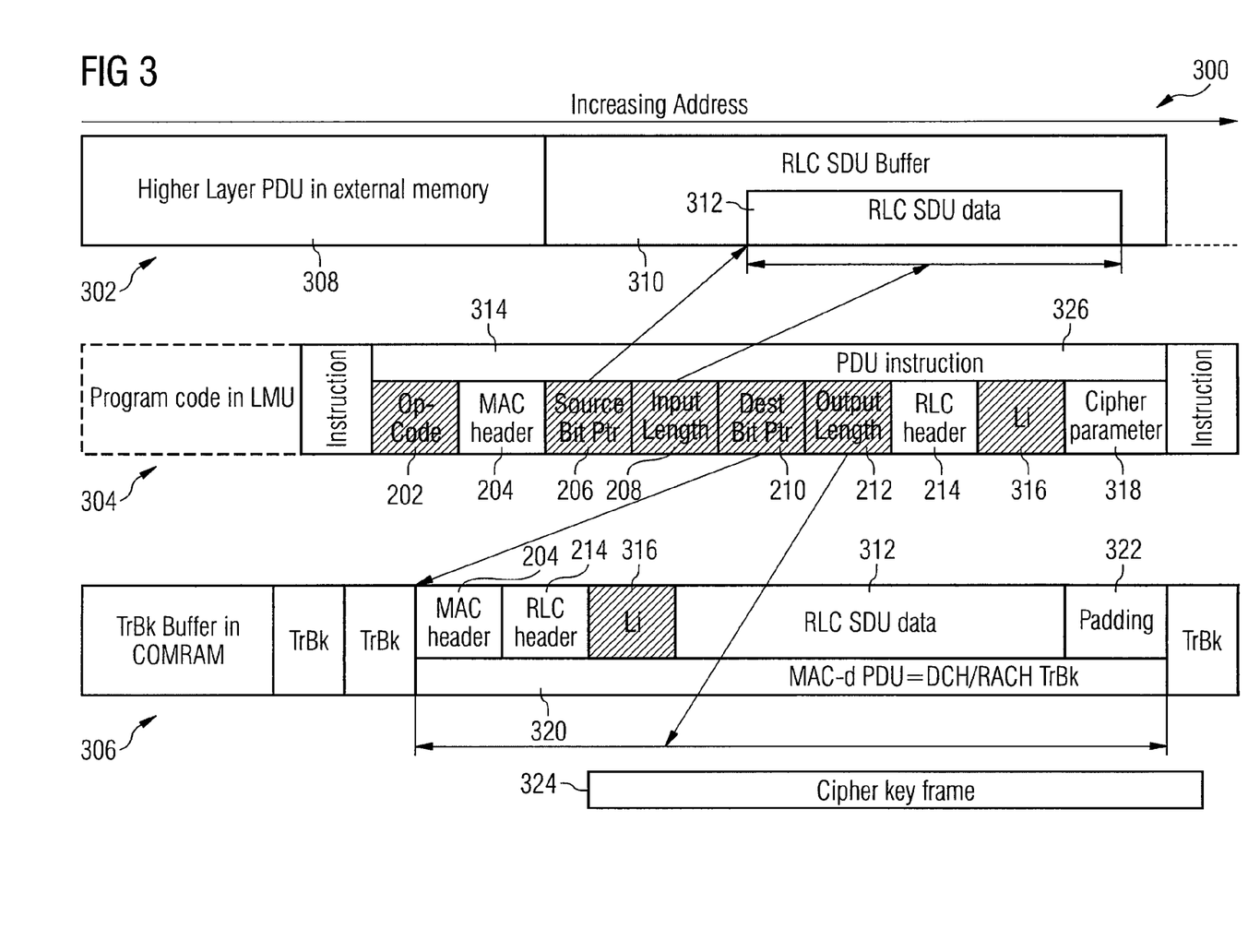
FIG. 3 shows an interpretation of the instruction example according to an embodiment of the invention.

FIG. 3 shows an example of an interpretation and processing of an instruction as shown in FIG. 2.

An exemplary program code in the Local Memory unit LMU 112 according to FIG. 2 is illustrated in line 304. The fields of the PDU instruction 226 correspond essentially to the fields of the instruction shown in FIG. 2, except to the fields 316 and 318, which are merged from the fields 216, 218, 220, 222 and 224 of FIG. 2.

Line 302 shows the higher layer PDU in the external memory 114, which is in this example the source data. The external memory 114 may include the RLC SDU buffer 310, that contains the RLC SDU data of a certain length indicated by the arrow below the RLC SDU data field 312.

Line 306 shows the Transport Block Buffer 206 that is stored in a specific memory COMRAM 116. The transport blocks are the output of the instruction 314. They are composed according to the OpCode 202 and the information contained in the instruction 314. The instruction 314 uses hereby the source RLC SDU data as input data and the data contained in the instruction itself to generate the transport block 320.

The MAC header 204 contained in the instruction code 326 is the first data field of the transport block 320, followed by the RLC header 214 and the Length Indicator field 316. The next field 312 contains the RLC SDU data, corresponding to the RLC SDU data of the source RLC SDU of the higher layer. The instruction uses the Source Bit Pointer 206 that points to the address of the beginning of the RLC SDU data 312 and the information of the Input Length field 208 to insert the RLC SDU data into the corresponding data field of the Transport Block 320. In an embodiment of the invention, the instruction (which may also be referred to as instruction message) further contains a destination bit pointer 210 that points to the start address of the Transport block 320 and the output length 212, i.e. the length of the Transport Block 320.

A cipher key frame 324 contains parameters for the ciphering. The ciphering key may be 128 bits long (although in an alternative embodiment of the invention, the ciphering key may have another length (e.g. 256 bits, 512 bits, 1024 bits, etc.) and is exchanged between the UE (User Equipment) and the SRNC (Serving Radio Network Controller) (not shown) during the authentication phase.

The remaining unused bits of the transport block are filled with padding bits in the padding field 322.

According to an embodiment of the invention, the instructions are of a fixed format.

For UMTS, High Speed Downlink Packet Access (HS-DPA) and High Speed Uplink Packet Access (HSUPA) have been introduced to increase the data rate in downlink direction and in uplink direction. In HSUPA, an enhanced uplink transport in WCDMA (Wideband Code Division Multiple Access) using a so-called Enhanced Dedicated Channel (E-DCH) time-diversity transmission techniques are applied. These time diversity transmission techniques may include ARQ (Automatic Repeat request) and HARQ (Hybrid ARQ), HARQ+Chase Combining, HARQ+IR (Incremental Redundancy). These ARQ schemes perform a repetition of sending of a Transport Block (TrBk) in case the TrBk was corrupted.

The MAC sublayer may include several different MAC entities, MAC-d, MAC-c/sh/m, MAC-hs, MAC-es/MAC-e and MAC-m.

The MAC-hs entity provides Hybrid ARQ functionality, and is only used on the HS-DSCH.

The MAC-es/MAC-e entities provide Hybrid ARQ functionality, and are only used with E-DCH.

Figure 4A:
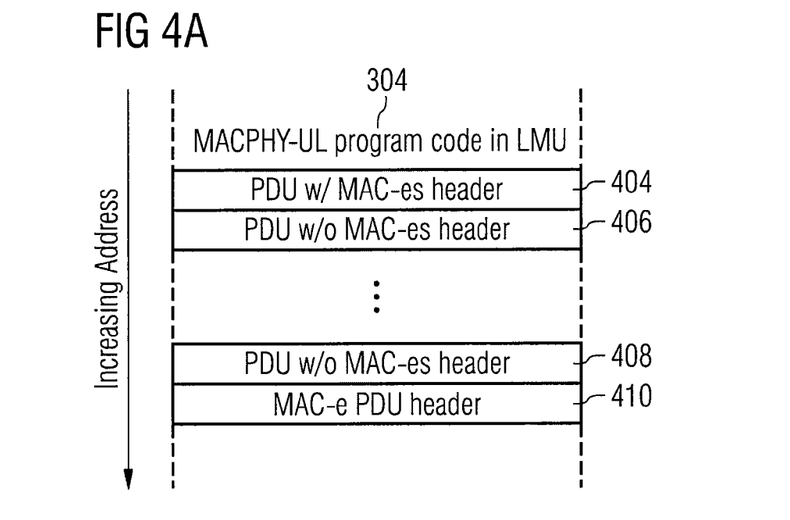
FIG. 4A shows an extract of a memory area of the Local Memory Unit according to an embodiment of the invention.
Figure 4B:
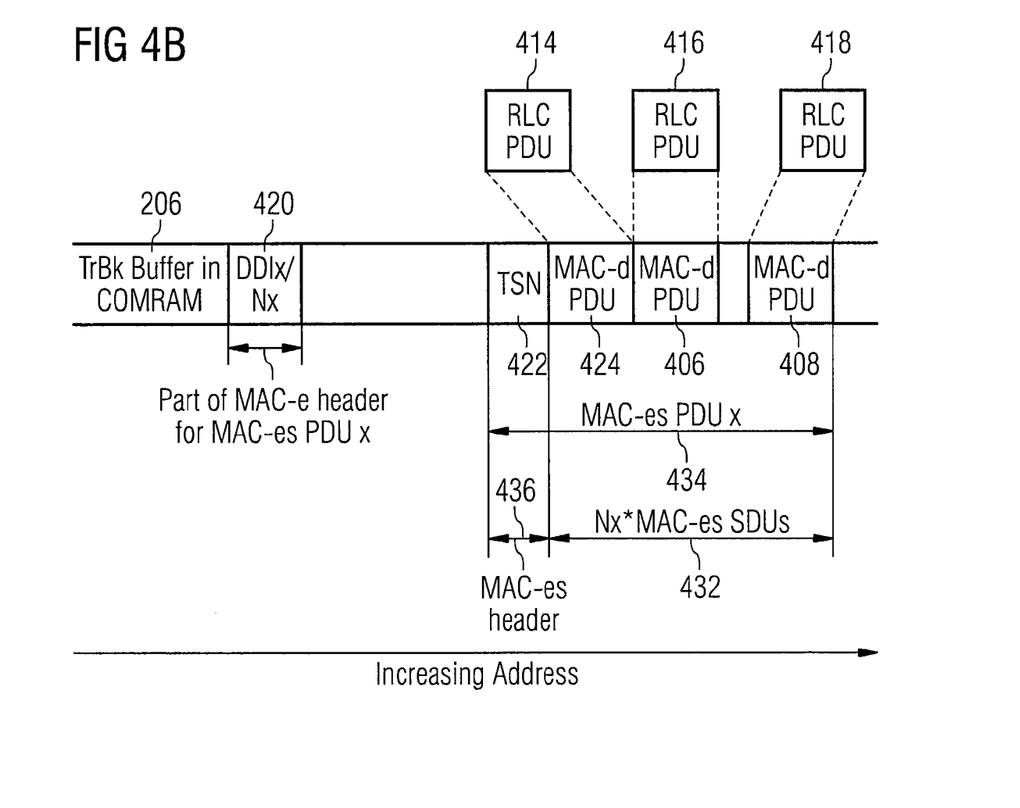
FIG. 4B shows an extract of a memory area of the of the output data memory according to an embodiment of the invention.

FIG. 4A and FIG. 4B show an example how a HighSpeed Uplink Packet Access (HSUPA) Transport Block is created by a sequence of single instructions of the co-processor.

Referring to FIG. 4A, the MACPHY-UL program code 304 with PDU instruction in the LMU 112 corresponding to the PDU instruction 314 in FIG. 3 is shown. In this example, LMU 112 contains a PDU instruction with MAC-es header 404, several PDU instructions without MAC-es header 406, 408 and a MAC-e PDU header 410. The addresses in the LMU 112 shown in 304 increase from the top downwards.

For the HSUPA, a PDU instruction with MAC-es header 404 is followed by several PDU instructions 406, 408 without MAC-es header. The sequence of PDU instructions without MAC-es headers is delimited by a MAC-e header 410.

Figure 4C:
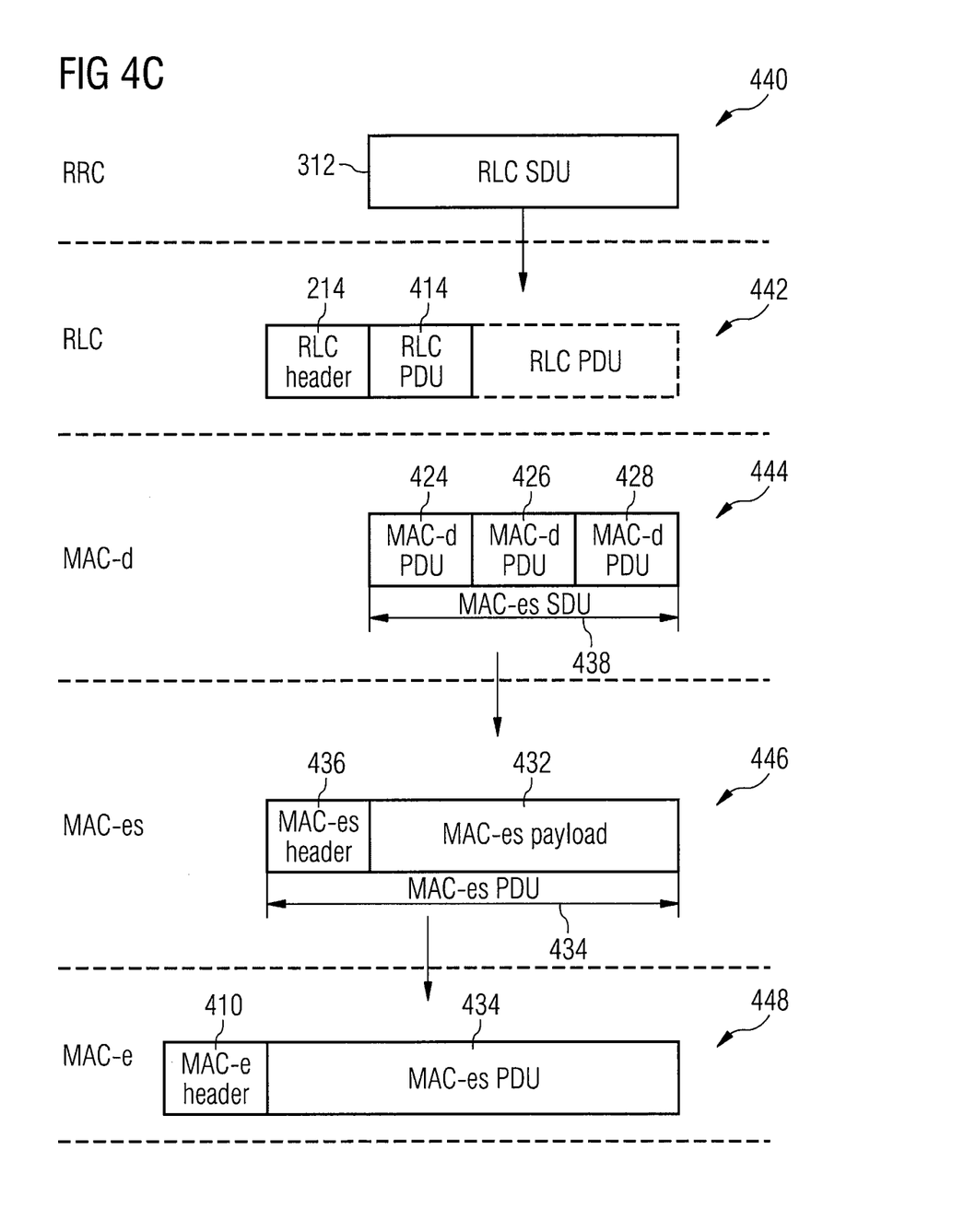
FIG. 4C shows an UMTS RLC/MAC architecture according to an embodiment of the invention.

FIG. 4B illustrates the content of the TrBk Buffer 206 in the COMRAM memory 116 in the case of a sequence of instructions and FIG. 4C explains the RLC/MAC architecture in UMTS for the uplink, i.e. EDCH case. Referring first to FIG. 4C, in the case of EDCH, there are two MAC sublayers, MAC-e 448 and MAC-es 446. MAC-es 446 sits on top of MAC-e 448 and receives PDUs directly from MAC-d 444. MAC-es SDUs 438 (i.e. MAC-d PDUs 424, 406, 408) of the same size and coming from a particular logical channel can be multiplexed together into a single MAC-es payload 432, to which the MAC-es header 436 is prepended, and which results in a MAC-es PDU 434. The MAC-d PDUs 424, 406, 408 include the RLC PDUs 414, 416 and 418, which are also shown in FIG. 3 for TrBk Buffer 306 in the COM RAM 116.

Referring to FIG. 4B, the MAC-e header 430 may include the number of PDUs and the data description indicator (DDI) value 420, indicated in FIG. 4B with DDIx and Nx for a MAC-es PDU x 434. The DDI field 420 identifies the logical channel, the MAC-d flow and size of the MAC-d PDUs 424, 406, 408 concatenated into the associated MAC-es PDU 434.

FIG. 4C shows for completeness also the RLC sublayer 442 above the MAC-sublayers that gets its RLC SDUs 312 from the higher RRC (Radio Resource Control) layer 440. The data exchanged between the RLC layer and the higher layer is an RLC SDU 312 and the data exchanged between the RLC layer and the lower layer is an RLC PDU 414. The size of an PDU may the the same as an SDU. In the RLC sublayer 442, an RLC header 214 is added.

The dedicated protocol stack co-processor 106 for the 3GPP/UMTS MAC layer and the RLC-layer in uplink direction (denominated MACPHY-UL 106 in the following) is meant for generating transport blocks for both the DCH (Dedicated Channels) and the transport blocks for the E-DCH (enhanced dedicated channel) according to the instructions of the software driver. One issue to be handled may be seen in that the DCH transport blocks are to be generated with a period of 10 ms on the one hand and that the E-DCH transport blocks are generally also to be generated with a period of 2 ms on the other hand.

Furthermore, there usually exist separate software drivers for the DCH and the E-DCH, which have to access the one and the same co-processor. From these two facts hence follows, that these two processes are a priori not synchronous and a control of the access is required.

Thus, for the dedicated protocol stack co-processor a method is desired for the synchronization between the controlling software driver and the co-processor 106.

A synchronization of the two described processes on software plane (e.g. by the operating system) usually had to control the order of the access to the co-processor. This could occur in two different ways:

A) The process for generating the E-DCH transport blocks was defined as master process and generated thus first the instruction for the MACPHY-UL 106. Subsequent to this, the MACPHY-UL 106 started the process for the DCH transport block generation as a slave process. After terminating the slave process, the overall code built in this way could be transferred to the MACPHY-UL 106 for execution.

B) Independent of the start order of the two competing processes, the process that wins the competition is granted the access to the co-processor 106 and thereafter the underdog.

Figure 5:
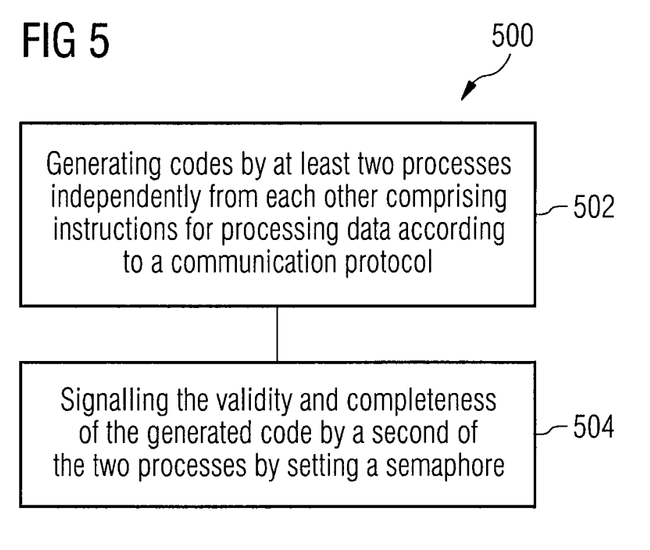
FIG. 5 shows a method for synchronizing the processing of codes according to an embodiment of the invention.

FIG. 5 shows a method 500 for synchronizing the processing of codes according to an embodiment of the invention, wherein at least two processes generate independently from each other codes containing instructions for processing data according to a communication protocol, as depicted in 502, and wherein a second of the two processes signals the validity and completeness of the generated code by setting a semaphore, for example, as depicted in 504.

According to a further embodiment of the invention, a processing circuit checks the semaphore after finishing the processing of a previous code and the code is processed if the semaphore is set.

According to an embodiment, a first of the at least two processes signals the release of its code for processing, and the released code is processed immediately.

According to an embodiment, the code is processed by a co-processor 106.

According to an embodiment, the code concerns user data of a communication protocol layer.

According to an embodiment, the communication protocol layer is a RLC/MAC layer of a mobile communication standard.

By the enhancement of the MACPHY-UL 106 with a process synchronization facility, it is achieved that independent from the start order of the two processes the first process can be started after the composition of the instruction for the MACPHY-UL 106 took place.

From this it follows that contemporaneously during the processing of the instruction of the first process, the second process can prepare its instruction for the MACPHY-UL 106.

Moreover, the second process only has to notify the MACPHY-UL 106 about the validity of the instruction after the composition of the instruction took place—independent whether the MACPHY-UL 106 has finished the processing of the instruction of the first process.

In either case, the MACPHY-UL 106 will start the processing of the instruction of the second process automatically.

In an embodiment of the invention, one or more of the following effects is achieved: A deeper and hence more effective pipeline structure can be established by the synchronization method described above. Thereby, process waiting times due to resource conflicts are reduced leading to an improved real time behaviour of the overall system.

According to an embodiment, the generated codes are finalized by a synchronization instruction.

Figure 6:
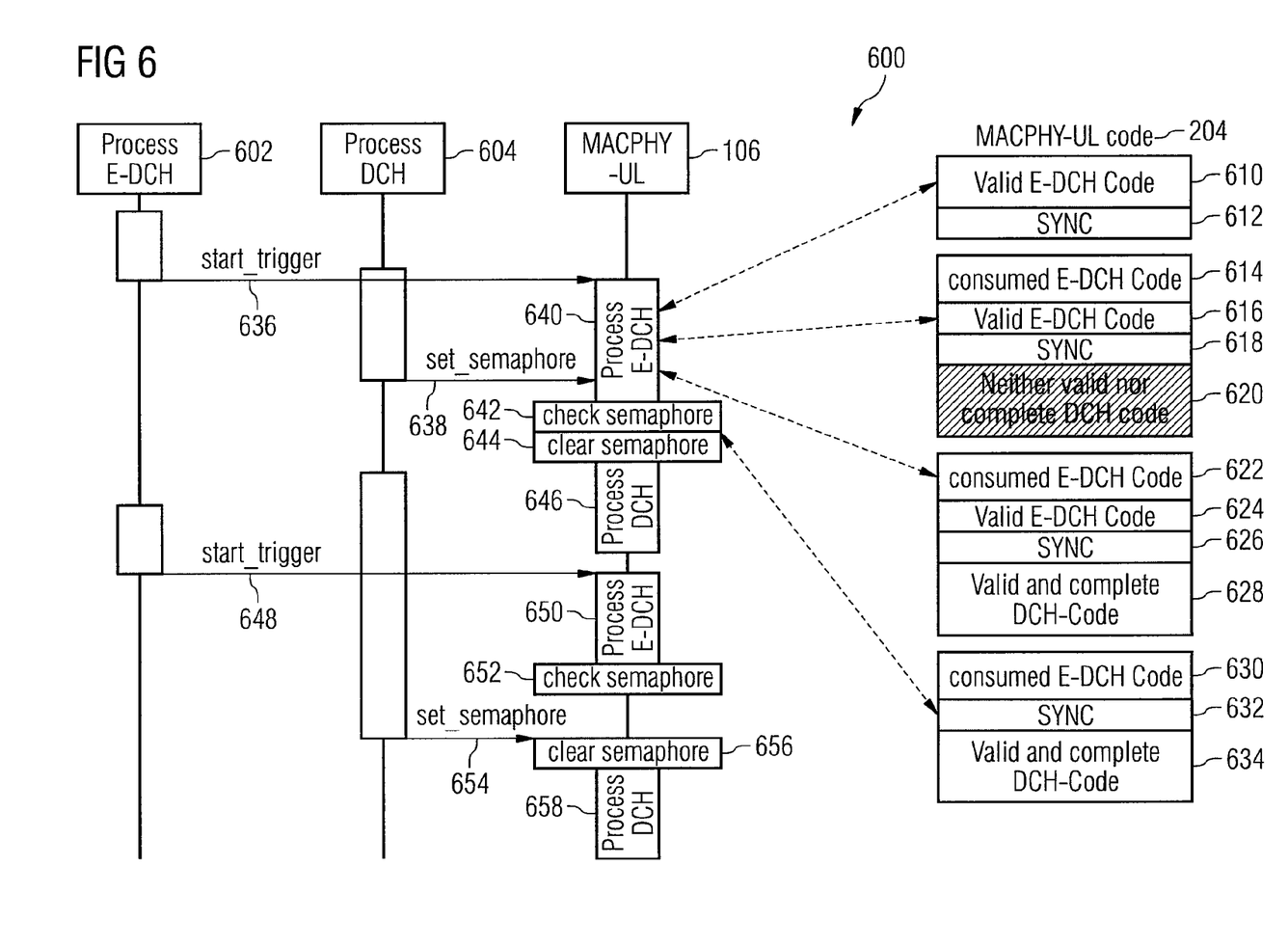
FIG. 6 shows an example of the synchronization of two processes according to an embodiment of the invention.

FIG. 6 shows an example of the synchronization of the processes.

The MACPHY-UL 106 instruction set contains a synchronization (SYNC) instruction. Furthermore, in the control interface of the MACPHY-UL 106 a semaphore is established, that can embrace two values:

1. No more instruction is available.
2. A further instruction is available

Executing a SYNC-instruction by the MACPHY-UL 106 together with the semaphore state may result in two different behaviours:

1. If value 1 is valid, MACPHY-UL 106 waits until the semaphore is set by the software (the second process). As soon as the semaphore is set, the MACPHY-UL process restarts at the instruction following the SYNC-Instruction. When restarting the semaphore is reset.
2. If value 2 is valid, the semaphore is reset and the MACPHY-UL 106 continues its process with the instruction following the SYNC-Instruction.

Reference number 602 represents the process E-DCH, reference number 604 the process DCH and reference number 606 the processing of the processes in the co-processor MACPHY-UL 106. Reference number 608 shows the code blocks in terms of valid code, consumed code, complete code of a process or SYNC-instruction to be processed by the MACPHY-UL 106. In the example, process 602 generates its code and sends a signal start_trigger 606 to the MACPHY-UL 106. The MACPHY-UL 106, being free, starts to process the valid instructions 610 previously generated by the process E-DCH. The end of the code is indicated by a SYNC instruction 612. In the meantime, process DCH 604 starts to generate its code.

In an embodiment of the invention, reference number 614 shows the part of the code yet processed by the MACPHY-UL 106, 614 shows the remaining valid E-DCH code, 616 the SYNC instruction and 618 the not yet finalized code generated by the process DCH 604, i.e. at this point of time the DCH code is neither valid nor complete. In an embodiment of the invention, reference numbers 622, 624 and 626 again show the consumed E-DCH code, the valid E-DCH code and the SYNC instruction at a later point in time. At this point in time, the process 604 has finished the generation of its code, so that the MACPHY-UL 106 can process the valid and complete DCH code 628 immediately after the termination of the E-DCH code processing. The process DCH indicates the completion of its code by sending a set_semaphore signal to the MACPHY-UL 106. The semaphore is checked in 642 as soon as the valid E-DCH code processing is terminated. Then, the semaphore is cleared in 644 and the DCH code can be processed. This is illustrated by the boxes 630, 632, and 634, i.e. the consumed code, the SYNC instruction and the valid and complete DCH code which has to be processed now, respectively.

The further procedure in this example is performed accordingly. The processes 602 and 604 generate their codes. When process 602 has finished the generation of its code, it sends a start_trigger signal 648 to the MACPHY-UL 106, which is immediately processed by the MACPHY-UL 106 in 650. When the co-processor has terminated the processing the semaphore is checked, which, however, was not yet set. Thus, the co-processor is idle between 652 and 656. The DCH process 604 sets a semaphore by sending a set_semaphore signal 654 to the co-processor. The semaphore arriving in 656 can be cleared instantaneously since the processor is free and the processing of the DCH code can performed in 658.

Figure 7:
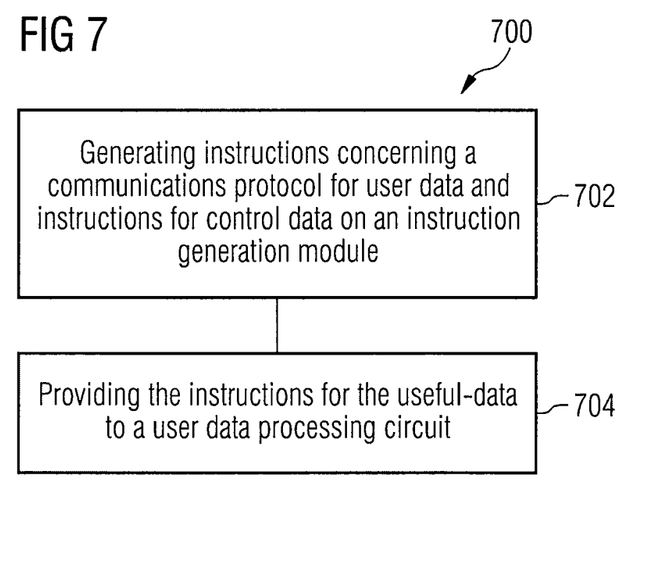
FIG. 7 shows a method for generating instructions according to an embodiment of the invention.

FIG. 7 shows a method 700 for generating instructions concerning a communication protocol according to an embodiment of the invention, wherein, as shown in 702, instructions for user data and instructions for control data are generated. According to this embodiment, in accordance with the method, the instructions for the user data and the instructions for the control data are generated in an instruction generation module, and the instructions for the user data are provided to a user data processing circuit.

The method might be implemented as software or at least partly in hardware on a configuration as shown in FIG. 1 with the processing module 102 that contains a first processor 104 on which the instructions are generated. The instruction generation module may be the first processor 104 or a software module running on the first processor 104.

According to an embodiment of the invention, the instruction generation circuit is a microcontroller, as e.g. the microcontroller 104 shown in FIG. 1 and the user data processing circuit is a co-processor, as e.g. co-processor 106. The term processor or microcontroller is used here representing any programmable logic device as e.g. microcontrollers, micro processors, FPGAs etc.

According to an embodiment, the data to be processed are extracted from an source data stream.

Referring to FIG. 1, the processor 102 is connected to a Local Memory 112 by the system bus 108.

According to an embodiment, the generated instructions are transferred to the Local Memory 112. The instructions are stored in the Local Memory 1 12 where they can be accessed by the co-processor 106.

According to an embodiment, the source data stream is stored in an external memory 114. The source data stream represents the input data for the instructions.

According to an embodiment, the source data stream comprises radio link control service data units (RLC SDUs). As explained above, the RLC SDUs are segmentated or reassembled by the co-processor 104 according to the instructions generated by the processor 102.

According to an embodiment, the user data circuit accesses the instructions stored in the Local Memory 112, and the user data processing circuit generates a target data stream according to the instructions. Further according to this embodiment, the target data stream is stored in an output data memory. The memory may be the COM RAM memory 116 in FIG. 1.

According to an embodiment, the target data stream comprises transport blocks of the physical layer of the communication protocol.

According to an embodiment, the communication protocol is a communication protocol according to a mobile communication standard, as e.g. UMTS, CDMA 2000, FOMA, etc.

According to an embodiment, the target data stream comprises at least a random access channel (RACH buffer), a dedicated channel (DCH) buffer and an enhanced dedicated channel Hybrid Automatic Repeat Request (E-DCH HARQ) buffer.

Figure 8:
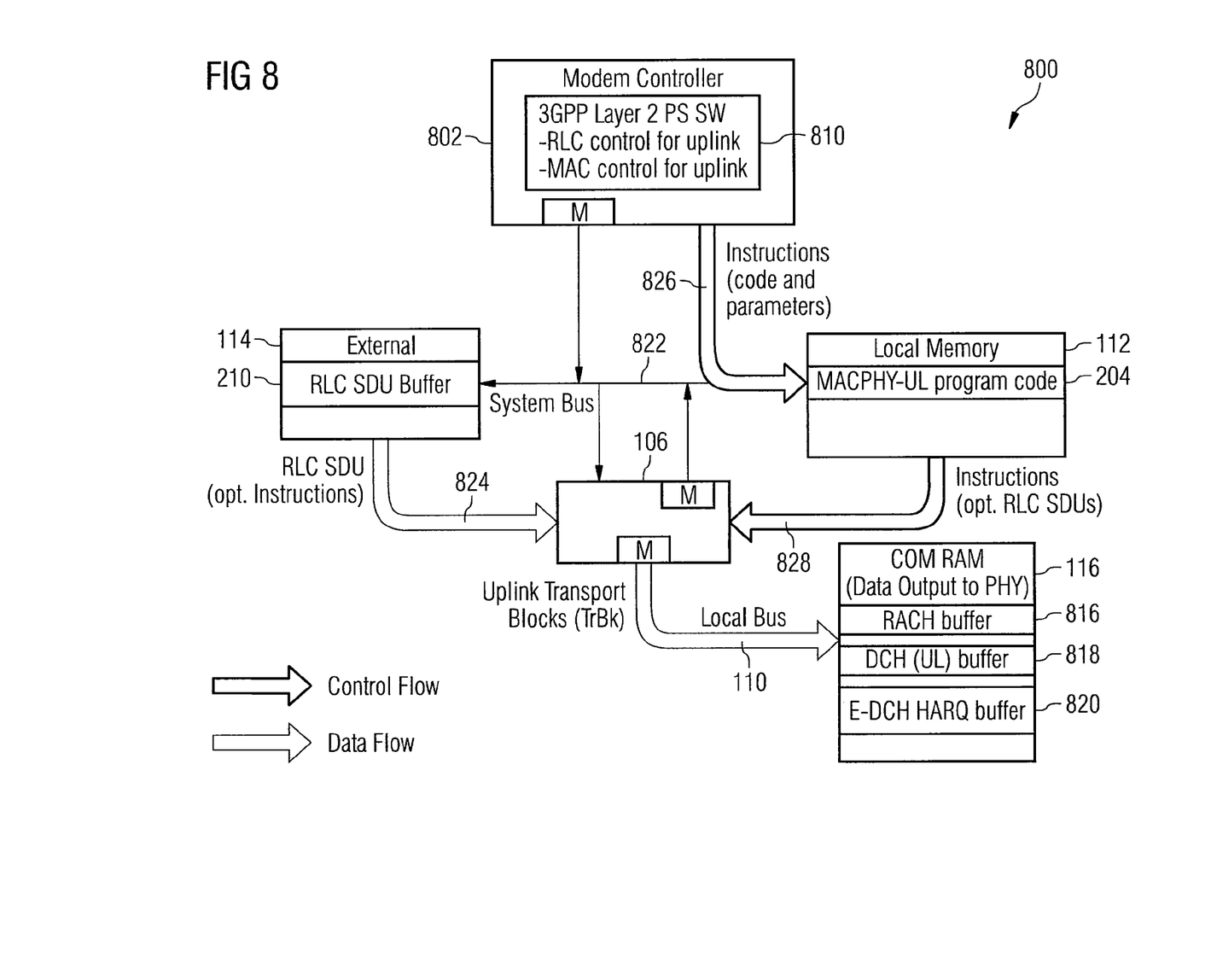
FIG. 8 shows the control data flow and the user data flow according to an embodiment of the invention.

In FIG. 8 the data and control flow 800 between the circuits are illustrated as an example for the uplink. The Modem Controller 802, corresponding to the processor 104 of FIG. 1, is responsible for the RLC control and the MAC control according to the 3GPP specification for layer 2. It executes the software functions of the protocol stack according to part a) and deposits the data processing instructions in MACPHY-UL program code form. The Modem Controller 802 has therefore a software module 810 which generates instructions consisting of code and parameters. The instructions are sent via the control flow 826 to the Local Memory 112 and stores MACPHY-UL program code 204. If this code is valid, the MACPHY-UL-co-processor 106, accesses the Local Memory 1 2 and reads the program from the Local Memory 1 2 and executes it autonomously. The MACPHY-UL-co-processor 106 has also access to the external DRAM (Dynamical Random Access Memory) 114 that contains an RLC SDU Buffer 210. The RLC SDU Buffer 210 is filled by the Modem controller 802 with the RLC SDU data. The user data (e.g. parts of the RLC SDU buffer) of the code are read from the external DRAM 114 according to the instructions of the code, processed in the co-processor 106 (e.g. by segmentation or ciphering) and complemented (with control or control information, respectively). The data generated in this way by the MACPHY-UL-co-processor 106 are uplink transport blocks (TrBk) of the physical layer. These overall output data is sent via the Local Bus 110 to a further memory, the COMRAM (Communication Random Access Memory) 116, and is provided to the subordinated physical layer. The COMRAM 116 contains RACH (Random Access Channel) buffer 816, the DCH buffer 818, in this example for the uplink and the E-DCH HARQ buffer 820.

Note: The invention in this document is described by means of an example that is conceived for the second protocol layer in uplink direction of a mobile communication device. The idea of the embodiments of the invention are applicable, of course, also in the opposite direction. In this case, for e.g. UMTS the HSDPA entities and features are used. For the downlink direction the PDUs are re-assembled by instructions generated by a first processor, eg. a microcontroller, and the instructions for the user data would be processed by a MACPHY-DL (Downlink) co-processor, analoguesly to the uplink case. As the corresponding sublayers to the MAC-e/es Medium Access Control protocol entities handling the Enhanced Dedicated Transport Channel (E-DCH) is the MAC-hs Medium Access Control entity handling High Speed Downlink Shared Channel (HS-DSCH), also the corresponding headers of the frames have to be taken into account.

In an embodiment of the invention, a processing module is provided for processing instructions, the instructions relating to user data and control data according to a communication protocol. In an embodiment of the invention, the processing module includes a first processing circuit to process the instructions relating to the control data, and a second processing circuit to process the instructions relating to the user data.

The first processing circuit may include a microcontroller and the second processing circuit may include a co-processor.

In an embodiment of the invention, the communication protocol is a communication protocol of a mobile radio communication standard.

Furthermore, the communication protocol may include a radio link control layer and a medium access control layer, and the instructions may handle data of the radio link control layer and the medium access control layer.

In another embodiment of the invention, the first processing circuit is configured to generate the instructions to be processed on the first processing circuit and the instructions to be processed on the second circuit and to provide the instructions to be processed by the second processing circuit to the second processing circuit.

In an embodiment of the invention, the processing module further includes a memory to store the instructions provided to the second processing circuit.

Furthermore, in another embodiment of the invention, the processing module further includes an interface to a processing module external memory to store user data of the communication layer in form of a source bit stream, and an interface to a memory in which the output data in form of an target bit stream generated by the second processing circuit according to the instructions.

The output data may be transport blocks of a physical layer of the communication protocol, wherein the instructions may be constituted of a fixed format for the generation of the transport blocks, and wherein the format may include data fields containing at least the one or more of the following information: Type of the transport block, source address and length of the source bit stream, target address and length of the target bit stream, header of the radio link control (RLC) protocol layer, header of the medium access control (MAC) protocol layer, ciphering parameter(s), control parameters for the second processing circuit.

In another embodiment of the invention, a processor circuit is provided, which is configured to generate a user data code for user data and a control data code for control data, wherein the codes comprise instructions for processing data according to a communication protocol and wherein the processor provides the code for user data to another processor circuit.

In an embodiment of the invention, the other processor circuit is a co-processor circuit.

In an embodiment of the invention, the processor circuit is configured to process only the control data code for the control data.

Moreover, in another embodiment of the invention, the communication protocol is a communication protocol of a mobile radio communication standard.

In an embodiment of the invention, the data is data of a medium access control layer and a radio link control layer according to the mobile radio communication standard.

Furthermore, the processor circuit may be configured to transfer the generated code to a memory.

In another embodiment of the invention, a processor circuit is provided, which is configured to process user data according to a communication protocol layer according to received instructions, wherein the instructions for processing the user data are generated by another processor circuit.

The communication protocol may be a protocol of a mobile radio communication standard.

Furthermore, the user data may be data of the radio link control layer and the medium access control layer of the communication protocol.

In an embodiment of the invention, the processor circuit further includes a memory to store the received instructions.

Further, the processor circuit may be configured to generate output data according to the received instructions, wherein the output data are in the form of an target data stream, and wherein the target data stream is stored in the memory.

The output data may be transport blocks of the physical layer of the communication protocol.

In another embodiment of the invention, an instruction set for processing data relating to a communication protocol is provided, wherein the instruction set includes instructions for user data of a communication protocol layer wherein the instruction set is generated by a first processing circuit and wherein the instruction set is processed by a second processing circuit.

The communication protocol may be a communication protocol of a mobile radio communication standard.

The user data may be data of a medium access control layer and a radio link control layer according to the mobile radio communication standard.

The instruction set may include a field with information about a source data address and a source data length of the relevant data comprised in a source data stream.

Furthermore, in an embodiment of the invention, the instruction set includes a field with information about a target data address and a target data length of the relevant data comprised in a target data stream.

Furthermore, the instruction set may provide information to the second processing circuit enabling the second processing circuit to generate the target data stream data from the source data stream data.

The instruction set may further include one or more of the following fields: Opcode Identifier, Medium Access Control (MAC) header, Radio Link Control (RLC) header, and/or Length Indicator (LI).

In an embodiment of the invention, the instructions are of a fixed format.

In another embodiment of the invention, a method for synchronizing the processing of codes is provided, wherein at least two processes generate independently from each other codes including instructions for processing data according to a communication protocol, and wherein a second of the two processes signals the validity and completeness of the generated code by setting a semaphore.

The method may further include checking the semaphore after finishing the processing of a previous code, wherein the code is processed if the semaphore is set.

In an embodiment of the invention, a first of the at least two processes signals the release of its code for processing, and the released code is immediately processed.

The code may be processed by a co-processor.

The code may relate to user data of a communication protocol layer.

The communication protocol layer may be a radio link control/media access control layer of a mobile radio communication standard.

The generated codes may be completed by synchronization instruction.

In another embodiment of the invention, a method for generating instructions relating to a communication protocol is provided, wherein instructions for user data and instructions for control data are generated, wherein the instructions for the user data and the instructions for the control data are generated on a instruction generation module, and wherein the instructions for the user data are provided to a user data processing circuit.

In an embodiment of the invention, the instruction generation circuit is a microcontroller, and the user data processing circuit is a co-processor.

In another embodiment of the invention, the data to be processed are extracted from a source data stream.

Furthermore, the generated instructions may be transferred to a memory.

Moreover, the source data stream may be stored in an instruction generating module external memory.

The source data stream may include radio link control service data units.

In an embodiment of the invention, the user data processing circuit accesses the instructions stored in the memory, the user data processing circuit generates a target data stream according to the instructions, and the target data stream is stored in an output data memory.

The target data stream may include transport blocks of the physical layer of the communication protocol.

Furthermore, the communication protocol may be a communication protocol according to a mobile radio communication standard.

In yet another embodiment of the invention, the target data stream includes at least a random access channel buffer, a dedicated channel buffer and an enhanced dedicated channel Hybrid Automatic Repeat Request buffer.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A processing module for processing user data instructions and control data instructions according to a communication protocol, the processing module comprising a first processor and a second processor wherein:
    the first processor is configured to generate user data instructions including a synchronization instruction and control data instructions according to a first process to generate independently from the first process at least further user data instructions including a synchronization instruction and control data instructions according to a second process, to provide the user data instructions and the further user data instructions to be processed by the second processor to the second processor, and to signal validity and completeness of the generated further user data instructions by setting a semaphore; and
    the second processor is configured to execute the synchronization instruction to check the semaphore after finishing processing of user data instructions, to process the further user data instructions if the semaphore is set, and to enter an idle state if the semaphore is not set.

2. The processing module of claim 1,
    wherein the first processor comprises a microcontroller, and
    wherein the second processor comprises a co-processor.

3. The processing module of claim 1, wherein the communication protocol is a communication protocol of a mobile radio communication standard.

4. The processing module of claim 1, wherein the communication protocol comprises a radio link control layer and a medium access control layer, and the instructions handle data of the radio link control layer and the medium access control layer.

5. The processing module of claim 1, wherein the processing module further comprises a memory configured to store the instructions provided to the second processor.

6. The processing module of claim 1, wherein the processing module further comprises:
    an interface to a processing module external memory configured to store user data of a communication layer in a form of a source bit stream; and
    an interface to a memory in which output data is stored in a form of a target bit stream generated by the second processor according to the instructions.

7. A method for synchronizing the processing of codes, the method comprising:
    at least two processes each generating independently from each other codes comprising user data instructions and a synchronization instruction for processing user data according to a communication protocol;
    a second of the two processes signaling validity and completeness of generated further code comprising user data instructions by setting a semaphore;
    a further process executing the synchronization instruction to check the semaphore after processing of code comprising user data instructions, and
    processing further code comprising user data instructions of the second of the at least two processes if the semaphore is set, and entering an idle state if the semaphore is not set.

8. The method of claim 7, further comprising:
    a first of the at least two processes signaling release of its code for processing; and
    immediately processing the released code.

9. The method of claim 7, wherein the code is processed by a co-processor.

10. The method of claim 7, wherein the code is user data code of a communication protocol layer.

11. The method of claim 10, wherein the communication protocol layer is a radio link control and/or media access control layer of a mobile radio communication standard.

* * * * *